(12) United States Patent
Hull et al.

(10) Patent No.: US 8,621,028 B2
(45) Date of Patent: Dec. 31, 2013

(54) CONTENT-RECOMMENDATION MESSAGE

(75) Inventors: Eric Hull, Seattle, WA (US); Thomas Forsythe, Seattle, WA (US); Christopher Bruce Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 12/264,476

(22) Filed: Nov. 4, 2008

(65) Prior Publication Data
US 2010/0115037 A1 May 6, 2010

(51) Int. Cl.
*G06F 15/16* (2006.01)

(52) U.S. Cl.
USPC .......................................... 709/209

(58) Field of Classification Search
USPC .......................................... 709/209
See application file for complete search history.

(56) References Cited

U.S. PATENT DOCUMENTS

| | | |
|---|---|---|
| 6,769,028 B1 | 7/2004 | Sass et al. |
| 6,976,082 B1 | 12/2005 | Ostermann et al. |
| 7,281,034 B1 | 10/2007 | Eyal |
| 7,421,723 B2 | 9/2008 | Harkness et al. |
| 2002/0087642 A1 | 7/2002 | Wei et al. |
| 2007/0055783 A1 | 3/2007 | Gourraud |
| 2008/0127289 A1 | 5/2008 | Julia et al. |
| 2008/0301241 A1* | 12/2008 | Svendsen ...................... 709/206 |
| 2009/0030792 A1* | 1/2009 | Khivesara et al. ............. 705/14 |

FOREIGN PATENT DOCUMENTS

WO  2007131221 A2  11/2007

OTHER PUBLICATIONS

"Zune Drives Next Generation of Digital Music Experience with Community Web Site Built Around Music", Dated: Oct. 2, 2007, Webpage available at :—http://www.microsoft.com/presspass/press/2007/oct07/10-02ZuneNextGenPR.mspx.
Shilov, Anton, "Microsoft Introduces New Zune Digital Media Players", Dated: Oct. 2, 2007, Webpage available at :—http://www.xbitlabs.com/news/multimedia/display/20071002231440.html.
"Windows Media Player", 2004, Microsoft Corporation, 212 Pages.

* cited by examiner

*Primary Examiner* — Maceeh Anwari
(74) *Attorney, Agent, or Firm* — Alleman Hall McCoy Russell & Tuttle LLP

(57) ABSTRACT

Digital content items are shared using content-recommendation messages by recognizing an indication of a digital content item to be recommended and recognizing an indication of an intended recipient of the digital content item. A content-recommendation message for that digital content item is then built. The content-recommendation message includes first instructions for displaying, with a first visual appearance and a first feature set, information relating to the digital content item if the intended recipient belongs to a first class. The content-recommendation message includes second instructions for displaying, with a second visual appearance and a second feature set, information relating to the digital content item if the intended recipient belongs to a second class.

20 Claims, 8 Drawing Sheets

CONTENT-RECOMMENDATION MESSAGE

BACKGROUND

Digital content can be enjoyed using computing devices configured to store, organize, and playback songs, videos, games, and other forms of digital media. In fact, the variety of digital content that can be enjoyed on such devices is becoming overwhelming. As digital content becomes more ubiquitous, it becomes increasingly challenging to provide users with an easy-to-use experience for finding and acquiring new digital content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Digital content items are shared using content-recommendation messages by recognizing an indication of a digital content item to be recommended and recognizing an indication of an intended recipient of the digital content item. A content-recommendation message for that digital content item is then built. The content-recommendation message includes first instructions for displaying, with a first visual appearance and a first feature set, information relating to the digital content item if the intended recipient belongs to a first class. The content-recommendation message includes second instructions for displaying, with a second visual appearance and a second feature set, information relating to the digital content item if the intended recipient belongs to a second class.

DETAILED DESCRIPTION

Recommending and/or sharing digital content is disclosed. A variety of different types of digital content may be recommended without departing from the intended scope of this disclosure. As examples, digital content in the form of audio (e.g., songs, audio books, ringtones, podcasts, etc.), video (e.g., movies, television shows, video podcasts, etc.), games, photographs, textual works, applications, gadgets, and others may be recommended. While described in the context of digital music below, it is to be understood that the below description can be applied to virtually any type of digital content.

Figure 1:
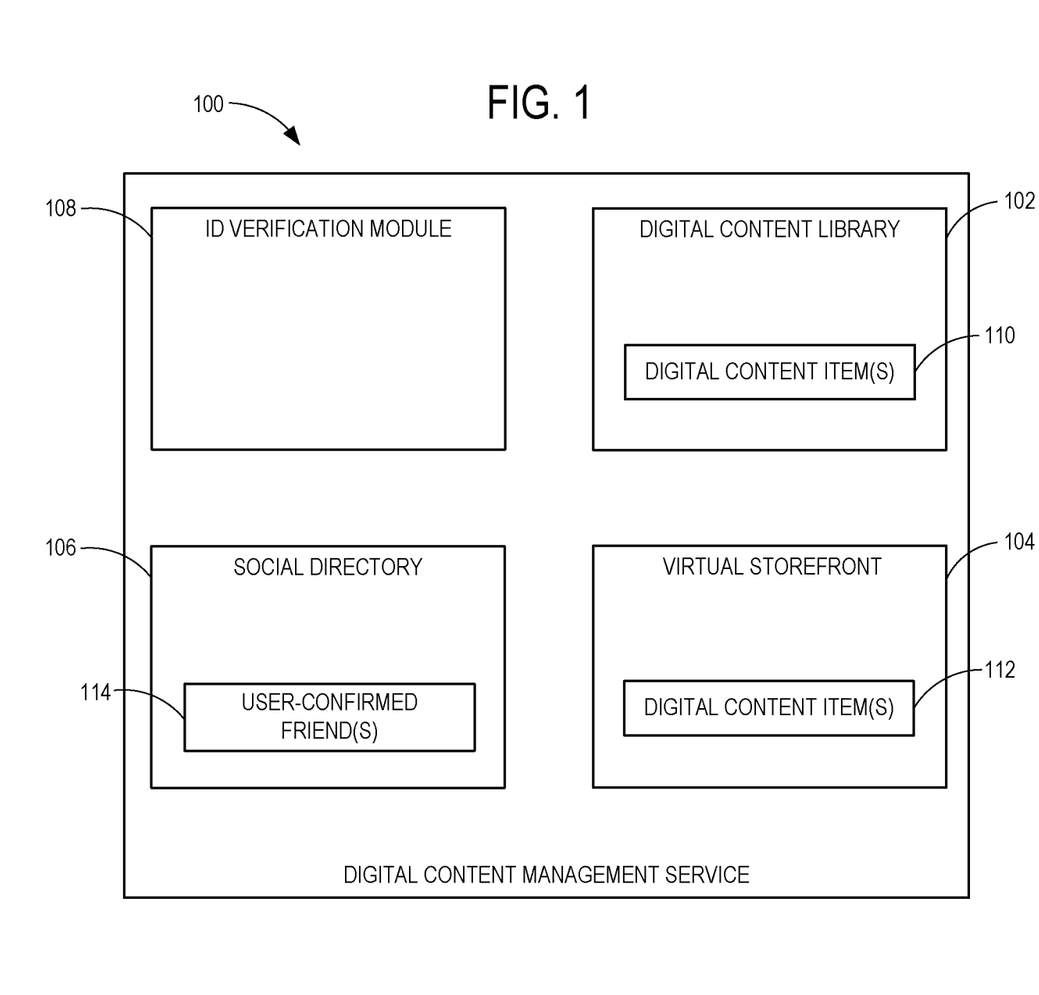
FIG. 1 schematically shows a digital content management service in accordance with the present disclosure.

FIG. 1 schematically shows a digital content management service 100, which may also be referred to as a DCMS in the drawings and the description. The digital content management service 100 may include a digital content library 102, a network-accessible virtual storefront 104, a network-accessible social directory 106, and an identification verification module 108. While FIG. 1 shows digital content management service 100 in the context of a single user, it is to be understood that virtually any number of different users may belong to a digital content management service, and each user may have one or more personal or shared digital content libraries, and each user may access one or more network-accessible virtual storefronts and/or network accessible-social directories.

The digital content library 102 may include (i.e., provide access to) a plurality of locally-saved and/or remotely-saved digital content items 110 previously acquired by a user. For example, the user may have downloaded songs and podcasts from the Internet, ripped music from a CD, and/or uploaded video from a camcorder and stored such audio and video files as digital content items 110 in one or more media storage devices, such digital content items 110 being catalogued and made accessible via the digital content library 102. Such digital content items may be recommended and/or shared with other users in accordance with the present disclosure.

The network-accessible virtual storefront 104 may include a plurality of digital content items 112 available for acquisition by the user. For example, the network-accessible virtual storefront 104 may offer audio files, video files, and other products and services for sale, rent, preview, and/or subscription. If the user purchases a file from the network-accessible virtual storefront 104, it can be added to the digital content library 102 as one of the digital content items 110. Digital content items available for acquisition via the virtual storefront 104 may be recommended and/or shared with other users in accordance with the present disclosure.

Further, the digital content management service 100 may include a network-accessible social directory 106 including a plurality of user-confirmed friends 114. For example, the network-accessible social directory 106 may allow the user to invite other users and accept invitations from other users to be friends. As will be described herein, user-confirmed friends may help the user to socially discover music, videos, and other products or services that the user may be interested in previewing and/or purchasing. Likewise, a user may help user-confirmed friends discover new digital content. As described in more detail below, digital content can be recommended to other users of a digital content management service and/or to others that are not thought to belong to the digital content management service.

As illustrated, the digital content management service 100 may further include an identification verification module 108 that commonly limits acquisition access to the network-accessible virtual storefront 104 and directory access to the network-accessible social directory 106. Limits imposed by the identification verification module 108 may be contingent on verification of a common credential. In one example, this credential may include a username and password. Thus, when a user wants to purchase a file, for example, from the network-accessible virtual storefront 104, that user may be asked to login with a username and password. The same username and password may be used to gain access to the directory of user-confirmed friends 114 in the network-accessible social directory 106. In other words, by logging on a single time with the same username and password, a user may have full access to both the network-accessible virtual storefront 104 and the network-accessible social directory 106. The network-accessible social directory 106 and the network-accessible virtual storefront 104 are protected by a shared identity-verification module 108. Further, when a user receives a content-recommendation message, as described below, the user may access the message and take full advantage of the message's features while logged in to the digital content management service. In other words, if already logged in to the digital content management service, the user need not complete a separate login procedure to take full advantage of the content-recommendation message.

In some embodiments, a device, such as a mobile communication device or a mobile media player, may be configured to implement the identification verification module 108. Furthermore, the identification verification module may log a user into the digital content management service when the user logs onto the device.

The digital content library 102, the network-accessible virtual storefront 104, and/or the network-accessible social directory 106 may be accessible via a same locally executed set of instructions, such as a locally-executed application or software platform, configured to present a shared graphical user interface offering functionality from the digital content library, the network-accessible virtual storefront, and/or the network-accessible social directory. Such a locally-executed application or software platform may be configured for execution on a variety of different computing devices, including portable media devices, personal computers, gaming consoles, and others. In some embodiments, the digital content library 102, the network-accessible virtual storefront 104, and/or the network-accessible social directory 106 may be accessible via a network-accessible service (e.g., as a web application accessed via the Internet).

In some embodiments, a digital content management service may include some clients that execute from locally saved instructions and some clients that access the service via a general purpose application, such as a browser application. Whether operating from local instructions configured to offer digital content management services or from remote instructions operating via a browser, clients may access one or more remote databases that include digital content items, information about digital content items, shopping services, and/or other information or services. Further, it is to be understood that digital content items may be recommended from a digital content library, a network-accessible virtual storefront, or another sub-service from a variety of different clients of a digital content management service.

Figure 2:
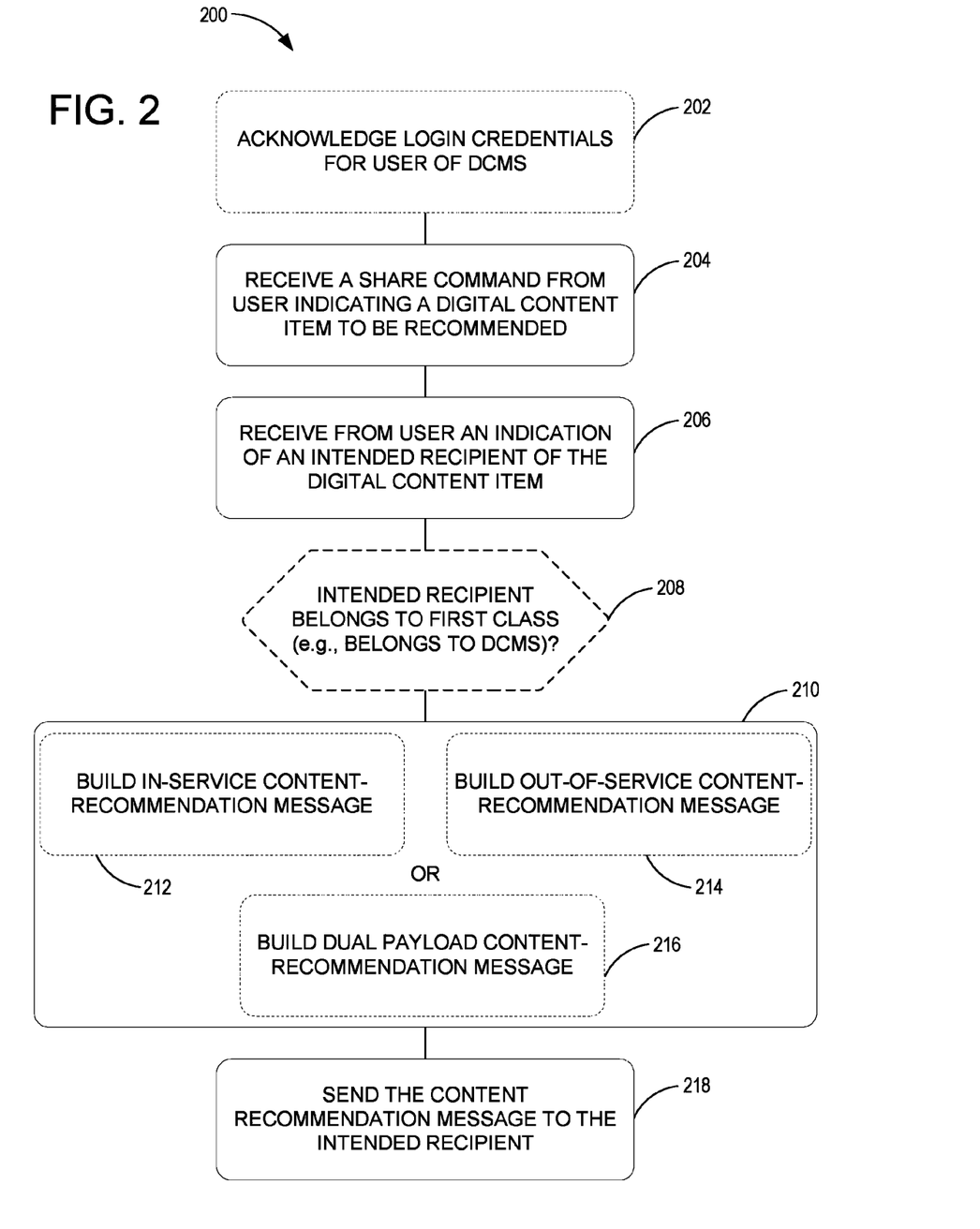
FIG. 2 is a process flow of an example method for sharing and/or recommending digital content items.

FIG. 2 shows a process flow of an example method 200 for recommending and/or sharing digital content. At 202, method 200 optionally includes acknowledging login credentials for a first user of a digital content management service. As a nonlimiting example, the first user may enter a username and password into a client of the digital content management service, and the client may verify the username and password. If the username and password are valid, the user may be logged in to the digital content management service, and may therefore have access to a network-accessible virtual storefront, a network-accessible social directory, a digital content library, and/or other information or services of the digital content management service. As described above, login credentials may be entered into a variety of different clients (e.g., locally executed software package, software as a network service, etc.) without departing from the scope of this disclosure.

At 204, method 200 includes receiving a share command from a first user indicating a digital content item that is recognized by the digital content management service and that is to be recommended. For example, in some embodiments, a user may select a digital content item (e.g., a song or album) that the user would like to share with a friend. Such a digital content item may be selected from a digital content library, a network-accessible virtual storefront, or from another aspect of the digital content management service.

Figure 3A:
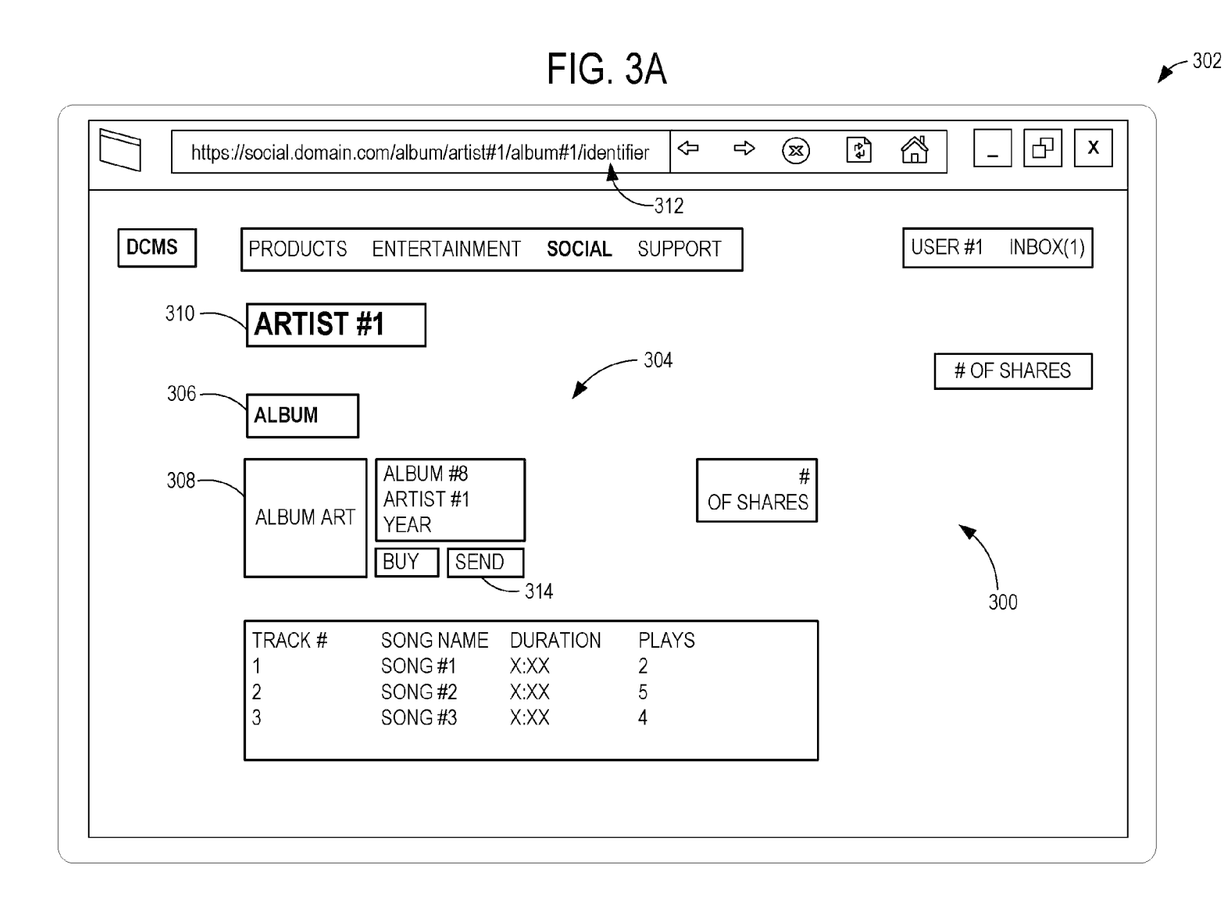
FIGS. 3A and 3B show user interfaces for selecting a digital content item to be recommended.

As a nonlimiting example, FIG. 3A shows a user interface 300 of a web client 302 of a digital content management service. The user interface 300 is displaying an album 304 that the user is browsing. In this example, the user interface is displaying an album name 306, album artwork 308, and artist name 310. Further, in this example, the URL at which information for this album is displayed includes an identifier 312 that uniquely identifies this album from other digital content items recognized by the digital content management service. In the illustrated embodiment, the identifier 312 is schematically illustrated as the word "identifier." However, it is to be understood that the identifier 312 may take a variety of forms that allow one identifier to be distinguished from another. As a nonlimiting example, in some embodiments, the identifier 312 may take the form of a GUID (i.e., globally unique identifier), a very large number initially generated in a random manner.

User interface 300 also includes a "send" button 314 that the user may select in order to issue a share command that indicates that the user wishes to recommend and/or share album 304. If the user wishes to share a different digital content item, the user may navigate to such digital content item and select the "send" button 314 associated with that digital content item.

Figure 3B:
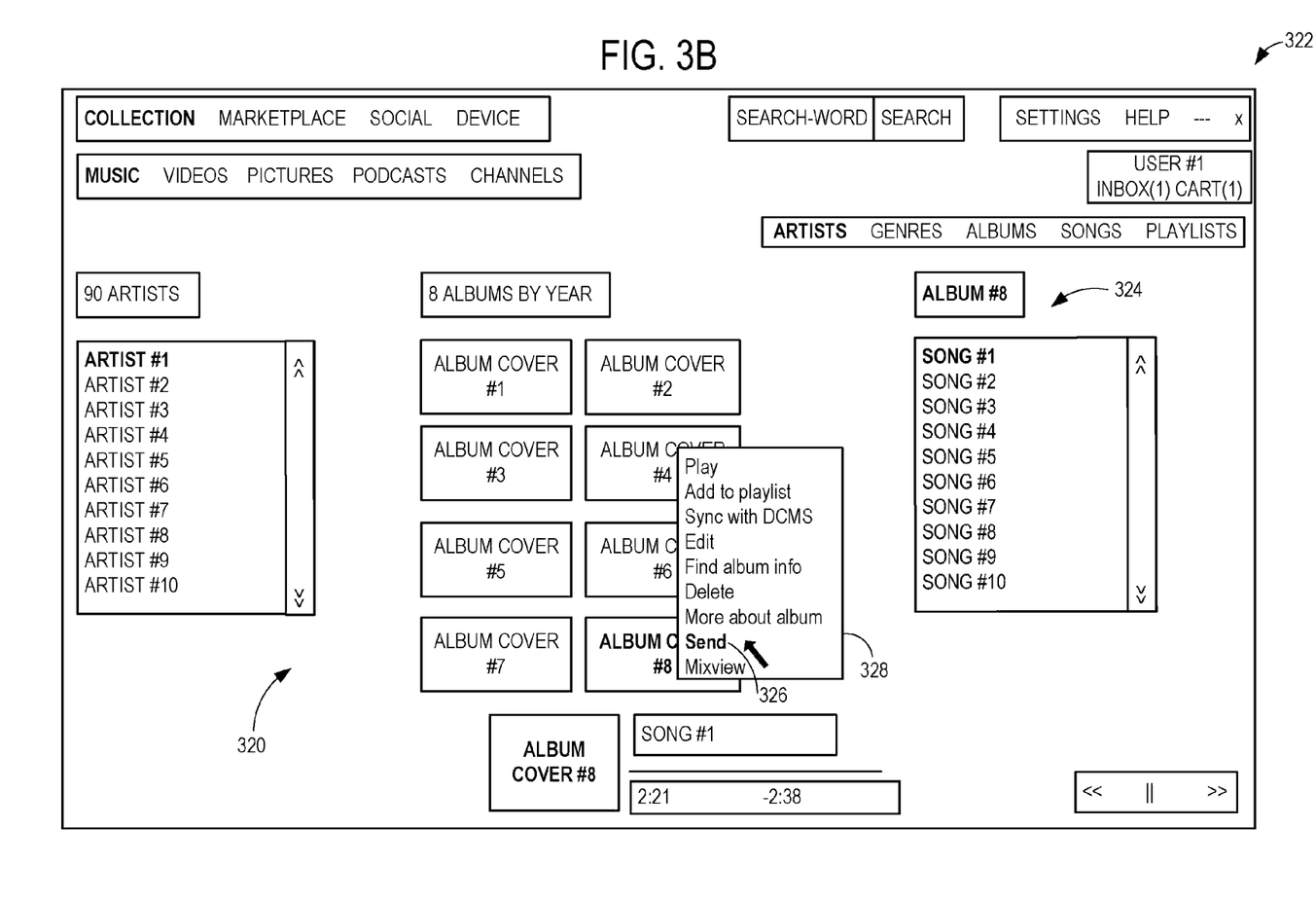

It is to be understood that other user interfaces may be designed to allow a user to select a digital content item for sharing in a different manner. As a nonlimiting example, FIG. 3B shows a user interface 320 of a locally-executed client application 322 of the digital content management service. The user interface 320 is displaying an album 324 that the user is browsing. User interface 320 allows the user to issue a share command for album 324 by right-clicking on the album and selecting a "send" element 326 in a pop-up menu 328. The above are only examples, and client applications may be configured to allow a user to select a digital content item in a variety of different ways. Method 200 includes recognizing an indication of a digital content item to be recommended regardless of how the indication is initiated. Such recognition may be performed, in full or in part, by a mobile device, a network-accessible, locally-executed application, or another suitable device.

Figure 4:
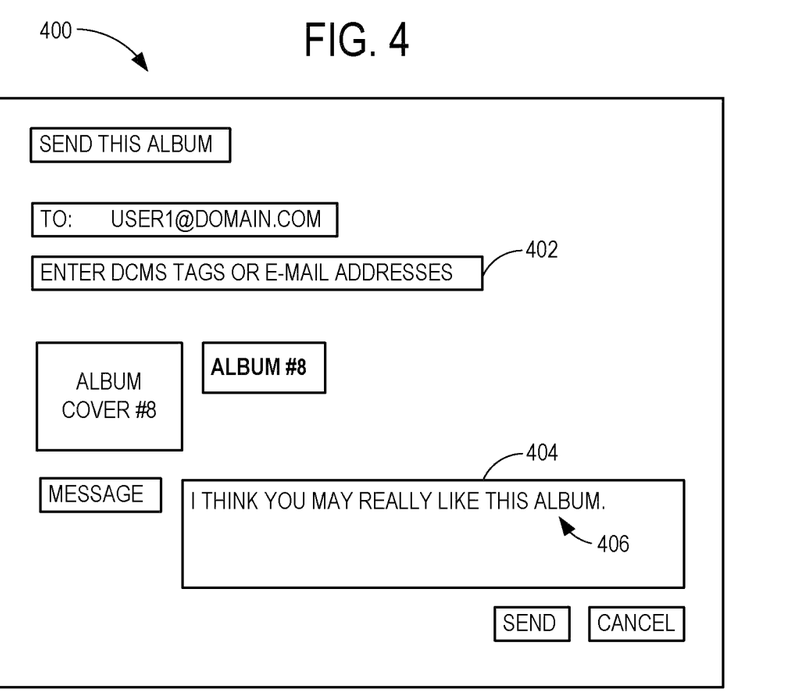
FIG. 4 shows a user interface for selecting an intended recipient of a content-recommendation message.

Turning back to FIG. 2, at 206, method 200 includes receiving from the first user an indication of an intended recipient of the digital content item. A first user may provide such an indication in any suitable manner. As a nonlimiting example, FIG. 4 shows a user interface 400 including a field 402 in which the user may supply one or more intended recipients of the digital content item. The user may supply an address of the intended recipient, where such address may be associated with a variety of different services, accounts, protocols, etc. (e.g., an e-mail address, a username or tag for a particular digital content management service, a username or tag for a particular social networking service, a phone number, etc.). For example, the user may type an e-mail address into field 402, the user may type a user address tag of the digital content management service, the user may use a social directory to select an e-mail address or tag, and/or the user may type or select an intended recipient's phone number. In some embodiments, the user may indicate that the content-recommendation message is to be sent to two or more different parties in parallel. Method 200 includes recognizing an indication of the intended recipient regardless of how the indication is initiated.

In the illustrated example, user interface 400 includes a field 404 in which the user may write a note 406 to the intended recipient (e.g., "I think you may really like this album."). In this way, the user is able to personalize a content-recommendation message that is sent to the intended recipient(s). In some embodiments, a user may be able to personalize a content-recommendation message by selecting colors, artwork, or other aspects of the message.

As mentioned above, the user may send a content-recommendation message to an intended recipient that belongs to the same digital content management service as the user and/or to an intended recipient that does not belong to the same digital content management service. The digital content management service may be designed to present content-recommendation messages to intended recipients accessing such messages via the digital content management service with one or more aspects and/or features that are not presented when such messages are accessed outside of the digital content management service (e.g., via e-mail).

Turning back to FIG. 2, at 208, method 200 may optionally include determining if the intended recipient belongs to a first class (e.g., users belonging to the same digital content management service as the sender) or belongs to a second class (e.g., users not known to belong to the same digital content management service as the sender). Such a determination may be made in any suitable manner. As an example, an address of the intended recipient may be tested to find if it is a valid address of the digital content management service (e.g., via a database comparison). As another example, it may be determined the intended recipient belongs to the digital content management service if an address of the intended recipient is not a valid e-mail address. Likewise, it may be determined that the user does not belong to the digital content management service if the address is a valid e-mail address. In some embodiments, an address with the following format may be considered a valid e-mail address: #@#.domain, where "#" is a variable-length placeholder and "domain" is any valid domain (e.g., "com," "net," "edu," etc.). In some embodiments, an address including "@" may be considered a valid e-mail address.

At 210, method 200 includes automatically building a content-recommendation message for the digital content item that is to be recommended and/or shared. In some embodiments, such a content-recommendation message may be customized for the intended recipient, and more specifically, to the platform on which the intended recipient is likely to view the content-recommendation message. In other words, if the recipient is a member of the digital content management service, the content-recommendation message may be built as an in-service message for viewing via the digital content management service, as shown at 212. If the recipient is not a member of the digital content management service, the content-recommendation message may be built as an out-of-service message for viewing via another platform, such as via e-mail, short messaging service, instant messaging, or another suitable mechanism, as shown at 214.

As shown at 216, in other embodiments, the content-recommendation message may be built the same regardless of the intended recipient, and the receiving device may access a subset of the content-recommendation message and use only such subset for presenting the content-recommendation message.

Whether the content-recommendation message is customized for a particular recipient or class of recipients or not, the content-recommendation message may include a variety of different types of information. As nonlimiting examples, the content-recommendation message may include an identification code uniquely identifying the digital content item within the digital content management service. In some embodiments, such an identification code includes a GUID. In some embodiments, the content-recommendation message may include metadata retrieved from a local copy of the digital content item being recommended (e.g., album name, artist name, genre, etc.). In some embodiments, the content-recommendation message may include a message from the sender (e.g., "I think you may really like this album."). The content-recommendation message may optionally include a copy of the digital content item that is being recommended, and such a copy may come with a limited-rights license (e.g., allows only three playbacks). Additional and/or alternative information may be included in the content-recommendation message without departing from the scope of this disclosure.

A content-recommendation message may further include first instructions for displaying, with a first visual appearance and a first feature set, information relating to the digital content item being recommended. For example, the content-recommendation message may include instructions for displaying information pertaining to the digital content item within the digital content management service. Alternatively or additionally, a content-recommendation message may include second instructions for displaying, with a second visual appearance and a second feature set, information relating to the digital content item outside of the digital content management service.

The content-recommendation message may or may not include the first instructions if the user does not belong to the digital content management service. Likewise, the content-recommendation message may or may not include the second instructions if the user belongs to the digital content management service. In other words, a content-recommendation message may be an in-service message that does not include instructions for presenting the message outside of the digital content management service, as shown at 212; and a content-recommendation message may be an out-of-service message that does not include instructions for presenting the message within the digital content management service, as shown at 214.

In embodiments in which the content-recommendation message includes both the first instructions and the second instructions, as shown at 216, it may be determined if the intended recipient belongs to the digital content management service or if the intended recipient does not belong to the digital content management service before or after building the content-recommendation message. In other words, in some embodiments the decision may be made at the sending side, while in other embodiments the decision is made at the receiving side. It other words, the decision made at 208, may be made at either the sending side or the receiving side.

If the decision is to be made at the receiving side, the content-recommendation message may include one or more indicators or clues that signal the presence of instructions that may be utilized by the receiving device for presenting the content-recommendation message in the most appropriate format.

As an example, the content-recommendation message may include an e-mail message configured for viewing outside of the digital content management service and the e-mail message may be sent with an attachment that is configured for viewing within the digital content management service. Both the e-mail message and the attachment may be configured to display information pertaining to the same digital content item, albeit via different platforms.

As another example, the content-recommendation message may be configured with a dual payload that may be richly unpacked on all devices compatible with the digital content management service while still being able to be opened by those devices that are not compatible with the digital content management service, albeit with a different visual appearance and/or features. In this way, even if a content-recommendation message was sent to an e-mail address, it may be opened within the digital content management service if the opening device is compatible with the digital content management service. With a dual payload a recipient is able to enjoy the richer version of the message when the opening device is capable of opening the corresponding payload. A special character sequence that is relatively inoffensive to human readers and distinct enough to be recognized by clients within the digital content management service may be used to signal the presence of the dual payload to a client within the digital content management service. The special character sequence may be distinct enough to avoid inadvertent triggering, but short enough to be easily overlooked in a plaintext body of a message. In this way, such a sequence will not confuse recipients reading the message with a device that is not compatible with the digital content management service. For example:

"I think you may really like this album. _dcms>https://social.domain.com/album/artist#1/album#1/identifier"

may be displayed as text with an http link to an album within the digital content management service if the message is viewed with a device that is not compatible with the digital content management service. A device that is compatible with the digital content management service may be configured to recognize "_dcms>" as signaling a dual payload, and the segment and URL may be replaced with dynamically created interface elements related to the digital content item being recommended (e.g., button to purchase the digital content item, controls to preview the digital content item in the message viewer, etc.).

At 218, method 200 includes sending the content-recommendation message to the intended recipient. As discussed above, this may include sending an in-service content-recommendation message, an out-of-service content-recommendation message, and/or a dual-payload content-recommendation message.

Figure 5A:
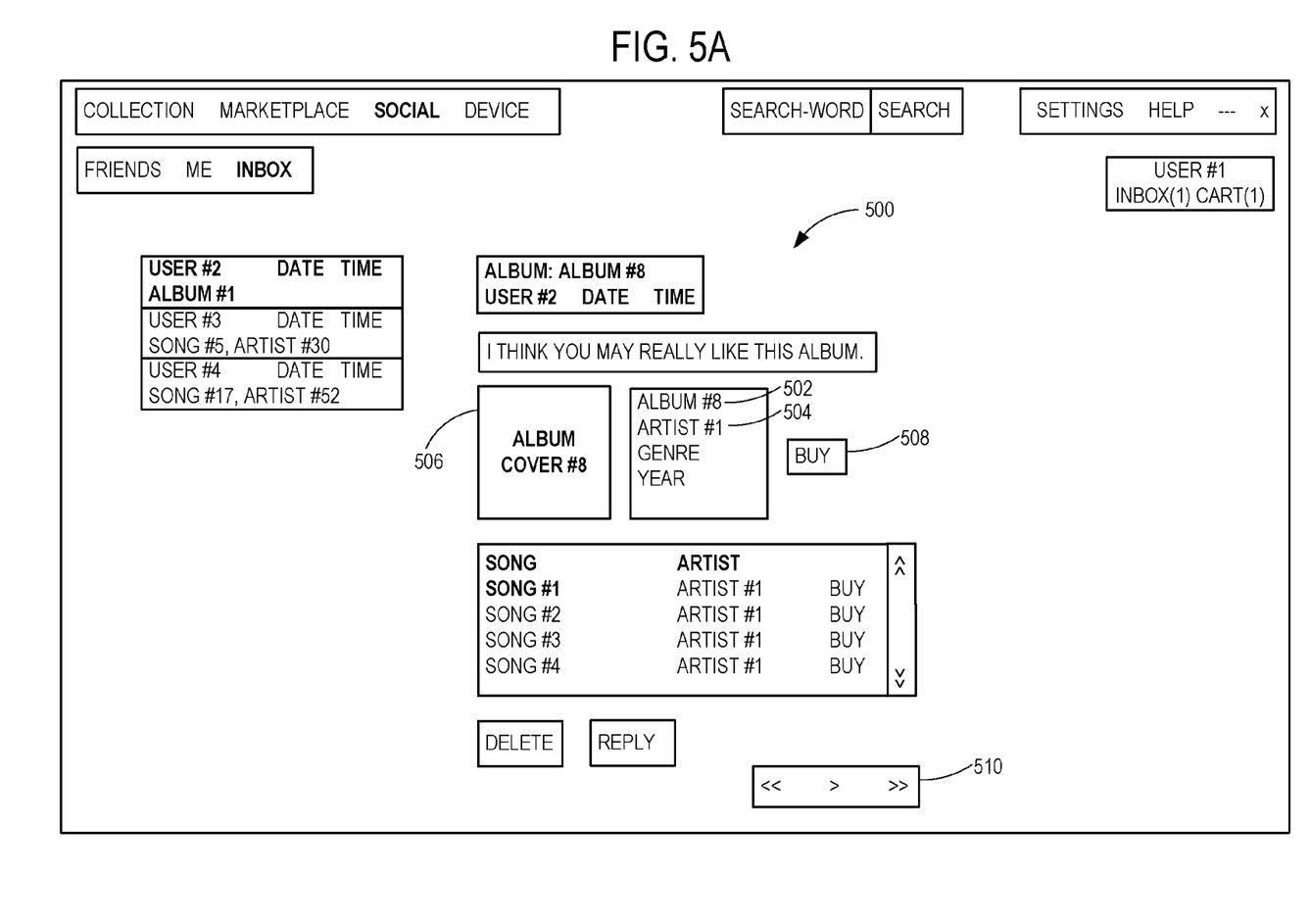
FIGS. 5A and 5B show content-recommendation messages viewed within a digital content management service.

FIG. 6A shows a nonlimiting example of an in-service content-recommendation message 500 viewed in a locally-executed client application of the digital content management service. Content-recommendation message 500 includes information pertaining to the recommended digital content item. In the illustrated example, content-recommendation message 500 includes a name 502 of the recommended album, an artist 504 that made the recommended album, album artwork 506 for the recommended album, as well as other information. Such information may be automatically accessed from the digital content management service, for example by using a GUID sent as part of the content-recommendation message. An out-of-service content-recommendation message may not be able to directly access the digital content management service, and thus may not be able to access all the information available for the recommended digital content item. Other examples of such information include, but are not limited to, popularity within the digital content management service, friends that listen to the recommended digital content item, news about the recommended album or artist, other digital content items in which the recipient may be interested, etc.

Furthermore, in-service content-recommendation message 500 includes a link 508 to directly purchase the recommended digital content item via the digital content management service without reverifying login credentials. In other words, because the recipient has already logged in to the digital content management service to view the content-recommendation message, the user need not reenter login credentials to take advantage of the network-accessible virtual storefront at which the recommended digital content item may be purchased.

Further still, in-service content-recommendation message 500 includes a link 510 (e.g., controls) to preview the digital content item via the digital content management service while content-recommendation message 500 is being presented by the digital content management service. Again, because the recipient is already logged in to the digital content management service, the recipient may take full advantage of the features afforded by the digital content management service, including the ability to preview digital content items. The ability to preview and/or purchase a recommended digital content item directly via the content-recommendation message is thought to greatly improve user experience, thus increasing the likelihood that users of the digital content management service will be able to use content-recommendation messages to find new digital content that they may enjoy.

Figure 5B:
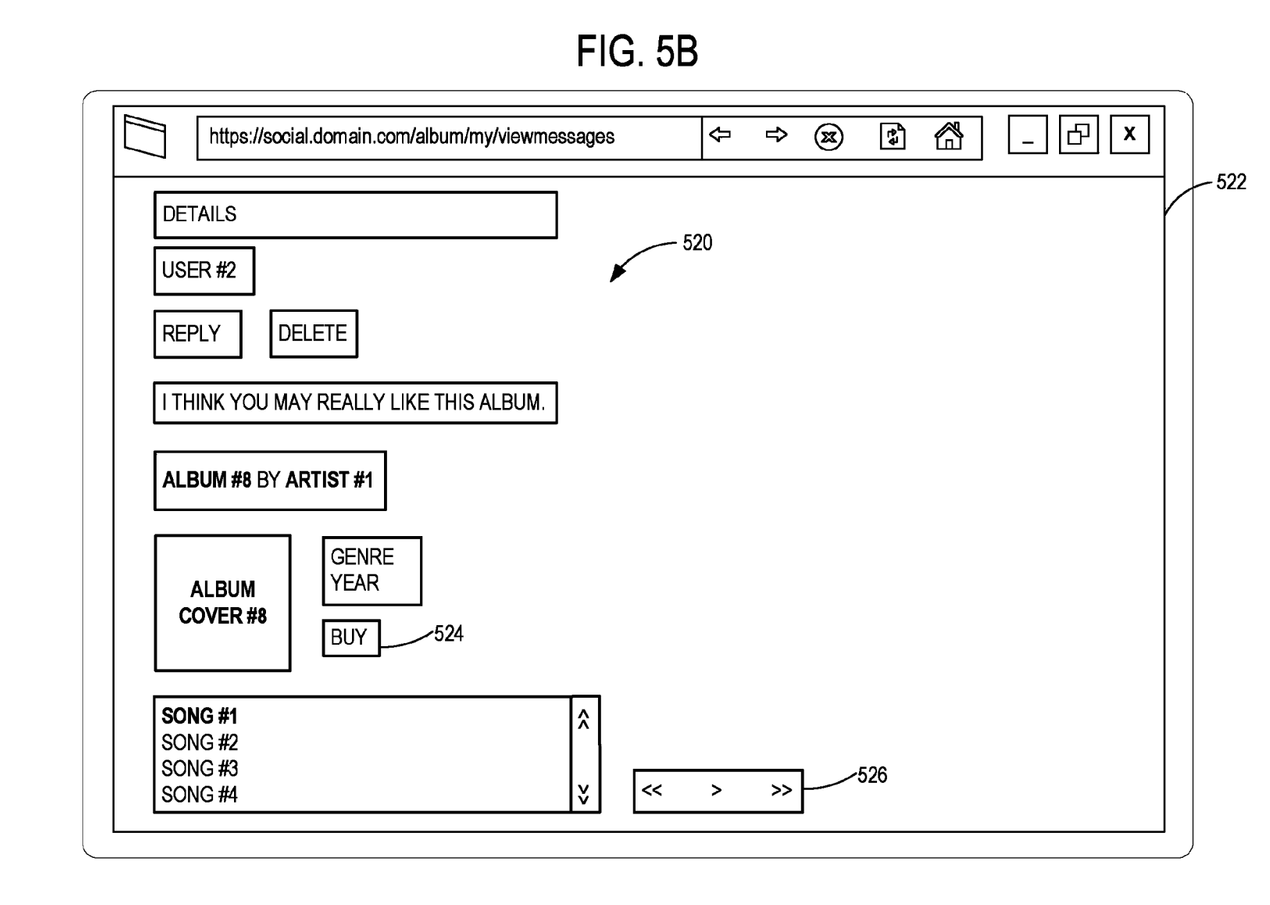

An in-service content-recommendation message may be viewed in a variety of different clients compatible with the digital content management service. As another example, FIG. 5B shows a nonlimiting example of an in-service content-recommendation message 520 viewed in a web browser 522 accessing a network-accessible client application. Like content-recommendation message 500 of FIG. 6A, content-recommendation message 520 includes, among other items, information pertaining to the recommended digital content item, a link 524 to directly purchase the recommended digital content item, and a link 526 to preview the recommended digital content item. However, as is apparent by comparing FIG. 5A to FIG. 5B, different client applications may present the same content-recommendation message differently. Further, it is to be understood that the content-recommendation messages of FIGS. 5A and 5B could be dual-payload content-recommendation messages as viewed within different clients of the digital content management service.

Figure 5C:
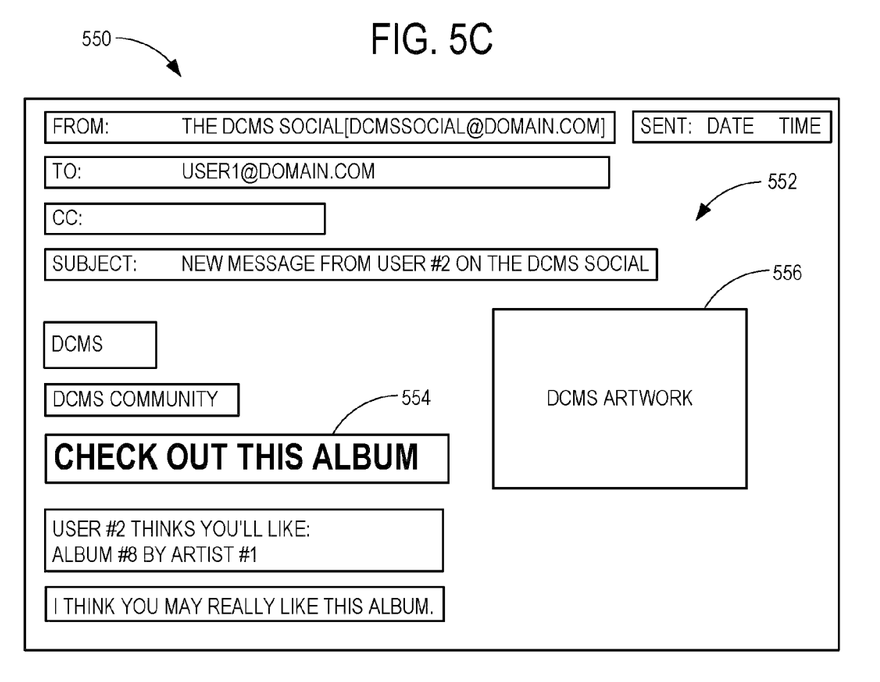
FIG. 5C shows a content-recommendation message viewed outside of a digital content management service.

FIG. 5C shows a nonlimiting example content-recommendation message 550 viewed outside of the digital content management service. In the illustrated embodiment, the content-recommendation message is viewed as an e-mail message 552 by an e-mail viewing application. The content-recommendation message may additionally or alternatively be viewed as an SMS message, and IM message, and/or other types of out-of-service messages. Content-recommendation message 550 includes information pertaining to the recommended digital content item. However, the out-of-service content-recommendation message, or dual-payload message viewed out of service, may have a different visual appearance and/or different features. As nonlimiting examples, content-recommendation message does not include album artwork, a link to directly purchase the recommended digital content, or a link to preview the digital content. The content-recommendation message may, however, include art (e.g., DCMS art 556) or other features for the digital content management service, which are not specific to the digital content item that is being recommended. Instead, content-recommendation message 550 includes a link 554 that directs the recipient to a client of the digital content management service, where the recipient can sign up for the service, log in to the service, preview the recommended digital content item, and/or purchase the recommended digital content item.

In some embodiments, a content-recommendation message (e.g., in-service, out-of-service, and/or dual payload) may include a link to a page or other interface that includes more detailed information pertaining to the recommended digital content item. Such a page may be an in-service page or an out-of-service page.

A content-recommendation message may include a protocol handler configured to launch a client of the digital content management service. For example the URL dcms://subscribe/?wallstrip=http://feeds.feedburner.com/wallstrip can launch a client of the digital content management service to subscribe to the recommended digital content item.

A content-recommendation message may include a link to a page configured to detect if a client of the digital content management service is installed and to launch the client if it is installed. If a client is not installed, the user can be automatically taken to a page including information about the recommended digital content item and/or informing the user that the client may be used to take advantage of the received recommendation.

Figure 6:
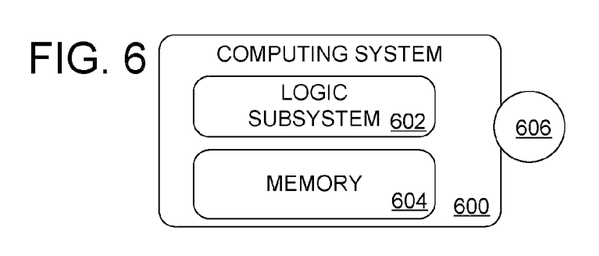
FIG. 6 shows a computing device capable of sending and/or receiving a content-recommendation message in accordance with the present disclosure.

In some embodiments, a content-recommendation message in accordance with the present disclosure may be sent and/or received by a variety of different computing devices. FIG. 6 schematically shows a computing device 600 that may send and/or receive a content-recommendation message. Computing device 600 includes a logic subsystem 602 and memory 604.

Logic subsystem 602 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 604 may include one or more physical devices configured to hold data and/or instructions that, when executed by the logic subsystem, cause the logic subsystem to implement the herein described methods and processes. Memory 604 may include removable media and/or built-in devices. Memory 604 may include optical memory devices, semiconductor memory devices, and/or magnetic memory devices, among others. Memory 604 may include portions with one or more of the following characteristics: volatile, nonvolatile, dynamic, static, read/write, read-only, random access, sequential access, location addressable, file addressable, and content addressable. In some embodiments, Logic subsystem 602 and memory 604 may be integrated into one or more common devices, such as a system-on-a-chip or an application specific integrated circuit.

FIG. 6 also shows memory in the form of removable media 606, which may be used to store and/or transfer instructions that, when executed, perform the herein described methods and processes.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. Memory storing instructions executable by a logic subsystem including a computer processor to perform:
   receive a share command indicating a digital content item that is recognized by a digital content management service and that is to be recommended;
   receive an indication of an intended recipient of the digital content item;
   responsive to receiving the indication of the intended recipient, determine if the intended recipient belongs to the digital content management service via a database comparison in which an address of the intended recipient is tested; and
   if the intended recipient belongs to the digital content management service:
      build an in-service content-recommendation message for the digital content item; and
      send the in-service content-recommendation message to the intended recipient without sending an out-of-service content recommendation message to the intended recipient; and
   if the intended recipient does not belong to the digital content management service:
      build an out-of-service content-recommendation message for the digital content item; and
      send the out-of-service content-recommendation message to the intended recipient without sending the in-service content-recommendation message to the intended recipient.

2. The memory of claim 1, where the instructions, when executed, determine the intended recipient belongs to the digital content management service if an address of the intended recipient is not a valid e-mail address.

3. The memory of claim 1, where the in-service content-recommendation message includes a link to directly purchase the digital content item via the digital content management service without reverifying login credentials.

4. A method of sharing digital content, the method comprising:
   acknowledging login credentials for a first user of a digital content management service;
   receiving a share command indicating a digital content item that is recognized by the digital content management service and that is to be recommended;
   receiving an indication of an intended recipient of the digital content item;
   responsive to receiving an indication of the intended recipient, determining if the intended recipient belongs to the digital content management service via a database comparison in which an address of the intended recipient is tested;
   automatically building, with a logic subsystem including a computer processor, a content-recommendation message for the digital content item, the content-recommendation message including instructions for displaying information pertaining to the digital content item within the digital content management service if the intended recipient belongs to the digital content management service, and the content-recommendation message including different instructions for displaying information pertaining to the digital content item outside of the digital content management service if the intended recipient does not belong to the digital content management service; and sending the content-recommendation message to the intended recipient.

5. A method of sharing digital content, the method comprising:

recognizing an indication of a digital content item to be recommended;

recognizing an indication of an intended recipient of the digital content item;

responsive to recognizing an indication of the intended recipient, determining if the intended recipient belongs to a first class via a database comparison in which an address of the intended recipient is tested;

automatically building, with a logic subsystem including a computer processor, a content-recommendation message for the digital content item, the content-recommendation message including first instructions for displaying on a first device, with a first visual appearance and a first feature set, information relating to the digital content item if the intended recipient belongs to the first class, and the content-recommendation message including second instructions for displaying on the first device, with a second visual appearance different than the first visual appearance and a second feature set different than the first feature set, information relating to the digital content item if the intended recipient belongs to a second class different than the first class; and sending the content-recommendation message to the intended recipient.

6. The method of claim 5, where the content-recommendation message includes an identification code uniquely identifying the digital content item within a digital content management service.

7. The method of claim 6, where the identification code includes a GUID.

8. The method of claim 5, where the content-recommendation message includes metadata retrieved from a local copy of the digital content item.

9. The method of claim 5, where the first instructions include a link to directly purchase the digital content item via the digital content management service without reverifying login credentials.

10. The method of claim 5, where the first instructions include a link to preview the digital content item via a digital content management service while the content-recommendation message is being presented by the digital content management service.

11. The method of claim 5, where the first class includes users belonging to a digital content management service and the second class includes users not known to belong to the digital content management service.

12. The method of claim 11, where the indication of the intended recipient includes an address of the intended recipient.

13. The method of claim 12, further comprising determining that the user belongs to the second class if the address is an e-mail address.

14. The method of claim 5, where the content-recommendation message does not include the first instructions if the user belongs to the second class.

15. The method of claim 5, where the content-recommendation message includes both the first instructions and the second instructions.

16. The method of claim 15, where the second instructions comprise an e-mail message.

17. The method of claim 16, where the first instructions comprise an attachment to the e-mail message.

18. The method of claim 5, where a mobile device recognizes the indication of the digital content item to be recommended and the indication of the intended recipient.

19. The method of claim 5, where a network-accessible server recognizes the indication of the digital content item to be recommended and the indication of the intended recipient.

20. The method of claim 5, where a locally-executed application recognizes the indication of the digital content item to be recommended and the indication of the intended recipient.

* * * * *